(12) United States Patent
Harris et al.

(10) Patent No.: US 6,763,888 B1
(45) Date of Patent: Jul. 20, 2004

(54) METHOD FOR TREATMENT OF UNDERGROUND RESERVOIRS

(75) Inventors: Ralph Edmund Harris, Horsham (GB); Ian Donald McKay, Yateley (GB)

(73) Assignee: Cleansorb Limited, Hampshire (GB)

( * ) Notice: Subject to any disclaimer, the term of this patent is extended or adjusted under 35 U.S.C. 154(b) by 0 days.

(21) Appl. No.: 09/936,689

(22) PCT Filed: Mar. 20, 2000

(86) PCT No.: PCT/GB00/01032

§ 371 (c)(1),
(2), (4) Date: Oct. 31, 2001

(87) PCT Pub. No.: WO00/57022

PCT Pub. Date: Sep. 28, 2000

(30) Foreign Application Priority Data

Mar. 19, 1999 (GB) ............................................. 9906484

(51) Int. Cl.[7] .............................................. F21B 37/00
(52) U.S. Cl. .................... 166/305.1; 166/300; 507/201; 507/267
(58) Field of Search .............................. 166/300, 305.1, 166/307, 376, 311; 507/267, 265, 201

(56) References Cited

U.S. PATENT DOCUMENTS

| 4,313,834 | A | * | 2/1982 | Harris ......................... 507/215 |
| 5,126,051 | A | | 6/1992 | Shell et al. |
| 5,226,479 | A | | 7/1993 | Gupta et al. |
| 5,247,995 | A | | 9/1993 | Tjon-Joe-Pin et al. |
| 5,881,813 | A | | 3/1999 | Brannon et al. |
| 5,911,923 | A | * | 6/1999 | Work et al. ................... 264/4.7 |
| 5,990,052 | A | * | 11/1999 | Harris ......................... 507/214 |
| 5,992,518 | A | * | 11/1999 | Whitlock ..................... 166/235 |
| 6,138,753 | A | * | 10/2000 | Mohaupt ................ 166/250.02 |
| 6,140,277 | A | | 10/2000 | Tibbles et al. |

FOREIGN PATENT DOCUMENTS

| EP | 0 696 335 | 2/1996 |
| WO | WO 95/33914 | 12/1995 |
| WO | WO 98/20230 | 5/1998 |
| WO | WO 00/40667 | 7/2000 |

OTHER PUBLICATIONS

SPE 65405 (SPE Drill and Completion 15 (3), Sep. 2000, 167–176, Driscoll et al.).
O'Driscoll: "New Treatment for Removal of Mud–polymer Damage in Multilateral Wells Drilled Using Starch–Based Fluids," pp. 167–176; *SPE Drill. & Completion* 15(3), Sep. 2000.

* cited by examiner

*Primary Examiner*—John Kreck
(74) *Attorney, Agent, or Firm*—Nixon & Vanderhye P.C.

(57) ABSTRACT

A method for treating an underground reservoir, which method comprises introducing into the reservoir a treatment fluid comprising, dissolved or dispersed in water, an ester and a polymer breaker, such that the ester hydrolyses to produce an organic acid to dissolve acid soluble material present within the reservoir and the polymer breaker degrades polymeric material present within the reservoir.

33 Claims, No Drawings

METHOD FOR TREATMENT OF UNDERGROUND RESERVOIRS

The method of the present invention is generally applicable to the production of oil, gas or water from wells drilled into underground reservoirs.

During drilling, workover and production operations there are numerous situations where the production rate of an oil, gas or water well following these operations is limited due to the presence of formation damage. Types of damage include, but are not limited to, the presence of polymer-containing filter cakes, fluids (including hydraulic fracturing fluids) filtrates or residues including polysaccharide-containing filter cakes, fluids, filtrates or residues, particulate materials such as fluid loss control agents and rock fines, biofilms, scales and asphaltenes.

Damage can be near wellbore, for example the presence of filter cake, or damage may be present deeper into the formation, for example in natural or induced fractures or in the rock matrix.

The effective removal of damage, especially near wellbore damage such as filter cake, can significantly increase the production rate of hydrocarbon or water producing wells penetrating underground formations. The effective removal of damage can also increase the injectivity of injection wells.

Conventional acids have been used for many years to treat damage in underground formations and stimulate the rate of oil or gas production. However, conventional acids have several drawbacks. They react rapidly with acid soluble materials which can result in poor zonal coverage and they are hazardous in use. To improve zonal coverage the use of high pressure, high rate injection is often attempted, which increases the hazards associated with their use. Due to the high corrosivity of conventional acids the use of corrosion inhibitors is also generally required. There is a greater need for corrosion inhibitors in higher temperature formations and corrosion inhibitors are generally toxic.

Damage is often caused by a combination of several components. For example, certain drilling muds or drill-in fluids contain calcium carbonate or dolomite in combination with a polymer or polymers which provides suitable rheological properties. Both the carbonate and the polymer contribute to the formation of a filter cake. Carbonate fines generated during drilling of carbonate rocks may also be present in the filter cakes.

Filter cakes generally contain high densities of polysaccharide. U.S. Pat. No. 5,247,995 cites SPE Paper 21497 which states that they can contain up to about 48% polysaccharide versus about 4% in fracturing fluids.

Filter cakes which do not contain carbonate may be susceptible to treatment with acid if they are present on wellbore surfaces in carbonate formations, as acid may attack the underlying carbonate and cause disruption of the filter cake.

It is an object of the present invention to provide a simple and effective method for treating formation damage within an underground reservoir.

It is a particular object of the present invention to provide simple and effective methods for the effective removal of filter cakes over long horizontal intervals.

Another object of the present invention is to provide single stage treatment methods which can remove damage and provide further stimulation of production or injection rate by increasing the matrix permeability of adjacent undamaged regions of the formation.

It is a further object of the present invention to provide methods which are environmentally acceptable by utilising components which are of low environmental impact.

Accordingly, the present invention provides a method for treating an underground reservoir, which method comprises introducing into the reservoir a treatment fluid comprising, dissolved or dispersed in water, an ester and a polymer breaker, such that the ester hydrolyses to produce an organic acid to dissolve acid soluble material present within the reservoir and the polymer breaker degrades polymeric material present within the reservoir.

The reservoir may be a hydrocarbon, such as gas or oil, reservoir. Alternatively the reservoir may be a water reservoir.

Sufficient ester or esters is present in the treatment fluid to produce sufficient acid, when the ester is hydrolysed, to have a substantive effect on filter cakes or other types of damage. By substantive effect it is meant that sufficient acid is produced on the hydrolysis of the ester to give sufficient dissolution of acid soluble material, present in or adjacent to the filter cake or other damage, to assist in the removal of damage. For example the dissolution of carbonate present in a filter cake, the dissolution of carbonate rock adjacent to a filter cake or the dissolution of carbonate rock adjacent to a biofilm. To obtain sufficient dissolution, it is necessary that a minimum of several percent w/v of acid is produced. The concentration of ester incorporated into the treatment fluid of the present invention will typically be at least 1% w/v but may be up to 20% w/v or higher. In general it has been found that 5% to 10% w/v ester when used in combination with a suitable polymer breaker or breakers is sufficient to give good removal of damage caused by filter cake. Preferably 5% to 20% ester will be used.

It is also intended that sufficient polymer breaker is present in the treatment fluid to have a substantive effect on the polymeric material present. The concentration of polymer breaker incorporated into the treatment fluid will vary according to the type of breaker employed but will be of the order of 0.005 to 60 kg/m$^3$, preferably 0.2 to 10 kg/m$^3$.

In general it is desirable to use a concentration of breaker which results in the breaking of the polymer over a period of several hours to allow the effective placement of the fluid. For example, too rapid a degradation of a filter cakes or biofilm may lead to localised fluid leak off, adversely affecting placement of the treatment fluid. This is analogous to the situation experienced in treatments using conventional acids, where the fast reaction rate can result in rapid breakthrough and wormholing and uneven fluid leak off. This can prevent the even placement of fluid over long horizontal intervals or into fractures or the rock matrix. It is a feature of the treatment fluids of the present invention that use of an ester rather than a reactive acid avoids wormholing and improves the placement of the fluid. In order to maintain this advantage in certain applications such as the treatment of long horizontal intervals, too rapid a degradation of polymers in for example filter cakes or biofilms should in general be avoided. Ideally, breakthrough of filter cakes or biofilms will be achieved after a period longer than that amount of time needed to place the treatment fluid. A delay in producing a substantive amount of acid and in breaking polymer allows even treatment of the target zone and excellent zonal coverage.

Use of an ester gives the advantages of effective placement of the fluid and avoidance of the use of corrosion inhibitors. Where suitable esters are selected, in particular where low toxicity, high flash point esters are used, there are also health and safety and environmental advantages. The initially neutral or slightly acidic pH of the fluid permits the incorporation of polymer breakers such as enzymes and oxidative breakers into the fluid without the compatibility problems encountered when such breakers are incorporated into highly acidic formulations based on mineral or organic acids.

It is preferable to use polymer breakers which are activated by, or whose activity is enhanced by, the change in conditions as the ester hydrolyses to produce acid. For example, peroxides which are activated by the development of acidic conditions or enzymes which have their activity enhanced by the development of acidic conditions.

An example of the former is the decomposition of calcium peroxide. This decomposes under acidic conditions to generate hydrogen peroxide.

Enzymes useful as polysaccharide breakers generally have a pH optimum in the range ph 3 to ph 7. Such enzymes will therefore have their activity enhanced by the generation of the moderately acidic conditions arising from hydrolysis of an ester. The generation of acidic conditions by the hydrolysis of esters in the presence of acid soluble material such as calcium or magnesium carbonates results in the formation of a self-regenerating buffer. For example, the production of acetic acid will produce an acetic acid-acetate buffer or production of formic acid a formic acid-formate buffer. If the produced acid reacts with acid soluble material it is replenished by more acid produced from the hydrolysis of remaining ester precursor ensuring maintenance of the buffer. This can provide ideal conditions for polysaccharide degrading enzymes causing less of the enzyme or enzymes to be needed to give the same degree of polymer breaking compared to the same enzymes working under sub-optimal pH conditions. The continual production of acid and maintenance of a buffer system in the method of the present invention even when the produced acid reacts with acid soluble material, ensures favourable pH conditions for enzyme breaker activity are maintained over a prolonged period. This contrasts with standard buffer fluids which contain a low concentration of acid or formulations which produce low concentrations of acid from precursors. In both these cases the acid will react with acid soluble material and will not be replenished. Any enzyme breakers present in this fluid will only operate at a favourable pH for a short period of time before the acid is spent and the pH becomes more alkaline.

Preferred esters for incorporation into the treatment fluid to be used in the present invention are carboxylic acid esters with low toxicity, high flash point and high environmental acceptability. Esters of ethanoic and methanoic acid (acetic and formic acid) are particularly suitable. The calcium and magnesium salts of these acids have good solubility in water.

The ester should be at least slightly water soluble. Preferably the ester should be soluble to at least 1% w/v in water and most preferably soluble to at least 5% in water.

The acid produced according to the method of the present invention is an organic acid, generally an aliphatic carboxylic acid. Preferably the acid is of formula $RCO_2H$ wherein R is hydrogen, an alkyl group having from 1 to 6 carbon atoms or $—R'—CO_2H$ where R' is a bond or an alkylene group having from 1 to 6 carbon atoms, the said alkyl or alkylene group being unsubstituted or substituted by halogen or hydroxy. Examples include 1,2,3,-propanetriol triacetate, 1,2,3,-propanetriol diacetate, ethylene glycol diacetate, diethylene glycol diacetate or triethylene glycol diacetate.

Where the acid has a hydroxy substituent, the ester may be a cyclic ester such as a lactone.

The alcohol portion of the ester may be monohydric or polyhydric as long as the esters are sufficiently water soluble at formation temperatures. Partial esters of the polyhydric alcohols can be used in which case the unesterified hydroxyl groups serve to increase the water solubility of the ester.

Most preferably the esters are acetic esters of 1,2,3-propanetriol (glycerol) and 1,2-ethanediol (ethylene glycol). The alcohol which is produced when the ester hydrolyses can act as a mutual solvent. The presence of a mutual solvent is generally considered to be beneficial in treatments of hydrocarbon bearing formations.

The treatment fluid needs to be shut in for a period long enough for the desired amount of acid to be produced. Ester hydrolysis proceeds slowly at low temperatures. For example at 10–40° C. the hydrolysis may take several weeks. This may be acceptable for some applications such as filter cake removal from a well which has been drilled but which is shut in for an extended time (of at least several weeks) before being put on production.

However, in general to obtain more useful rates of ester hydrolysis at temperatures below about 120° C. it is desirable to incorporate an enzyme into the treatment fluid. This is done by conventional means, for instance as described in U.S. Pat. No. 5,678,632. Lipases, esterases and proteases are the preferred enzymes for increasing the rate of ester hydrolysis in the method of the present invention.

At temperatures greater than about 120° C. thermal hydrolysis may proceed at a sufficient rate to be useable without the need for the addition of ester hydrolysing enzyme or enzymes.

In addition to the preferred esters which would normally comprise the majority of the esters present in the formulations of the current invention, it may also be beneficial in some damage removal applications to include in the formulation esters of chelating compounds such as malonic acid, oxalic acid or succinic acid (U.S. Pat. No. 5,082,056) ethylenediaminetetraacetic acid (EDTA) nitriloacetic (NTA) citric acid or hydroxyacetic acid (U.S. Pat. No. 5,223,159) which hydrolyse to produce efficient chelating compounds. Such compounds may be particularly useful to assist in the breaking of cross-linked polymers in combination with other polymer breakers. Some of the acids produced from the hydrolysis of the ester may be able to dissolve certain types of oilfield scale. For example hydroxyacetic acid can dissolve calcium sulphate.

Preferred polymer breakers of the present invention are oxidative breakers (oxidants) and enzyme breakers.

Oxidative breakers used in the present invention may be any one of those oxidative breakers known in the art to be useful to react with polysaccharides to reduce the viscosity of polysaccharide thickened compositions or to disrupt filter cakes.

The oxidative breaker is introduced into the treatment fluid containing the ester component. The oxidative breaker may be present in solution or as a dispersion. Suitable compounds include peroxides, persulphates, perborates, percarbonates, perphosphates, hypochlorites, persilicates and hydrogen peroxide adducts such as urea hydrogen peroxide and magnesium peroxide.

Preferred oxidative breakers for incorporation into treatment fluids to be used in the present invention are peroxides which can decompose to generate hydrogen peroxide. Of the oxidative breakers most preferred are percarbonates and perborates, most especially sodium percarbonate and sodium perborate.

Preferred enzyme breakers for use in the method of the present invention include those polysaccharide degrading enzymes known in the art to be useful to hydrolyse polysaccharides and thereby to reduce the viscosity of polysaccharide thickened compositions or to disrupt filter cakes. The enzyme breakers will be selected on the basis of their known ability to hydrolyse the polysaccharide components known or believed to be contributing to the damage. Examples of suitable enzymes which may be used to break polymers include enzymes which can hydrolyse starch, xanthan, cellulose, guar, scleroglucan, succinoglycan or derivatives of these polymers, Oxidative or enzyme breakers may also be used to hydrolyse other, non-polysaccharide polymers which may be incorporated into fluids for drilling workover or production operations.

In some embodiments of the present invention the effectiveness of the incorporated oxidant breakers can be enhanced by producing more reactive oxidants. Under certain conditions, for instance when a peroxide is included in the treatment fluid, the production of hydrogen peroxide in the presence of organic acid can result in the formation of a peracid which is a more effective oxidant than the hydrogen peroxide.

The efficiency of production of peracid can be enhanced by incorporating into the formulations certain hydrolytic enzymes which can produce a peracid from the ester and certain hydrogen peroxide yielding peroxygen compounds added as oxidants.

Esters are known to be hydrolysed by hydrolases (EC 3) such as a lipase (EC 3.1.1.3), an esterase (EC 3.1.1.1) or a protease (EC 3.4) in the presence of hydrogen peroxide or other peroxides to form a peracid (U.S. Pat. Nos. 3,974,082; 5,108,457; 5,296,161; 5,338,474; 5,352,594; 5,364,554). Peracids produced in-situ by such enzymes have been used for bleaching applications. Peracids are more effective oxidants than peroxides, particularly in the temperature range 25 to 80° C.

However, peracids are relatively unstable and cannot be used as such but may be formed in-situ from a peroxygen compound and a suitable peracid precursor. Where esters are already present in a formulation, the use of lipase, esterase or protease enzymes to produce the peracid from an ester and a peroxygen compound is preferable to the use of chemically perhydrolysable peracid precursors such as tetraacetylethylenediamine which are generally more expensive (for background see U.S. Pat. No. 5,364,554).

If a diacyl peroxide substrate is used, a peracid can be produced directly by an esterase without a requirement for hydrogen peroxide (U.S. Pat. No. 5,364,554).

Other reactions which can produce a bleaching compound direct are the action of sulfatase (EC 3.1.6) on peroxydisulfate to form peroxymonosulfate (U.S. Pat. No. 5,183,473) and the action of phosphatase (EC 3.1.4) on peroxydiphosphate to produce peroxymonophosphate (U.S. Pat. No. 3,666,399).

The use of enzymes for in-situ peracid production for the treatment of underground formations has not been taught in any of the prior art.

Enzymes with esterase activity, including lipases, esterases and proteases, may be used in the acidising method of U.S. Pat. No. 5,678,632 and No. 5,813,466 but their use to produce peracids in underground formations has not been described. Useable rates of ester hydrolysis at temperatures below about 120° C. are generally only obtained by the use of hydrolytic enzymes such as esterases, lipases or proteases. The incorporation of a peroxide into the treatment fluid used in the present invention, containing such enzymes, can therefore result in the formation of both organic acid and peracids giving formulations which are effective for both acidising and polymer breaking.

The ester and other chemicals required for the process of the present invention will normally be technical grade to reduce the cost of the process.

Where an enzyme is used, it is necessary to select an enzyme which remains active under reservoir conditions and in the treatment fluid for at least as long as the catalytic activity is needed.

Two types of enzymes may be used in the method of the present invention. Firstly, enzymes able to degrade polysaccharide polymers ("enzyme breakers") and secondly enzymes with esterase activity, such as esterases, lipases and proteases, which can produce peracids in the presence of hydrogen peroxide. Both types of enzyme are generally water soluble enzymes. It is generally advantageous for the enzymes to be readily water soluble although the enzymes may also be active and be used in low water activity environments or two-phase systems such as emulsions or dispersions. In particular, lipases may be more active in emulsions. Many lipases exhibit their highest activity at interfaces.

Typically, isolated enzymes are used. Enzymes may be isolated from plant, animal, bacterial or fungal sources. The enzymes may be produced from wild-type, conventionally bred, mutated or genetically engineered organisms. The enzymes may, optionally, be chemically modified, as long as they retain or possess the desired catalytic ability. Preferably, the enzymes will be industrial enzymes available in bulk from commercial sources.

The treatment fluid is formulated to reflect the type of damage expected and the conditions of the reservoir, in particular the temperature.

For example, to remove damage caused by a filter cake comprising calcium carbonate, starch and xanthan in a reservoir at 60° C. a treatment fluid comprising an acetic acid ester, an esterase and enzymes capable of degrading starch and xanthan may be formulated. The esterase enzyme is added to increase the rate at which ester hydrolysis takes place according to the method of U.S. Pat. No. 5,678,632.

To remove damage caused by a filter cake comprising-calcium carbonate, starch and xanthan in a reservoir at 110° C. a treatment fluid comprising an acetic acid ester and an enzyme capable of degrading starch may be formulated. The rate of hydrolysis of the ester is generally sufficient to be useable at 110° C. without addition of an esterase enzyme.

To remove damage caused by a biofilm in a carbonate formation at 50° C. a treatment fluid comprising an acetic acid ester, an esterase and a mixture of enzymes capable of degrading the polysaccharides present in typical biofilms may be formulated.

To remove damage caused by a biofilm in a carbonate formation at 80° C. a treatment fluid comprising an acetic acid ester, an esterase and a percarbonate may be formulated.

It is desirable that all of the components of a particular treatment fluid are compatible or if not fully compatible that they are sufficiently compatible to allow the desired amount of acid production and polymer breaking to occur over the duration of the treatment. For example it may be desirable to use a protease to enhance peracid production but the protease may adversely affect any other enzyme which is present if such enzyme is susceptible to attack by the protease. Similarly, any enzymes present will need to be tolerant to any oxidant used in the same formulation. Possible problems such as these will be evident to those skilled in the art and will generally be resolved before such formulations are used in the field.

The treatment fluid is normally prepared by dissolving or dispersing the ester and polymer breaker, optionally with an enzyme that can hydrolyse the ester and optionally with a peroxide, in suitable water. Examples include city (drinking)

water, produced water or sea water although in some situations it may be desirable to inject undiluted ester or a blend of ester with a hydrocarbon such as diesel. Typically an ester solution is prepared batchwise in tanks or other suitable vessels by adding the ester to the water with agitation and achieving thorough mixing by recirculating the ester solution through a blender such as a paddle blender for a suitable period of time. In some circumstances, use of an emulsion of the ester may be desirable. The other components of the treatment fluid are then added and recirculation continued. If batch wise preparation is not possible or desirable (for example if a dispersion is used which is difficult to keep evenly dispersed in a large holding vessel), or if it is preferred, the treatment fluid may be prepared by adding the individual components to water on a continuous, preferably carefully controlled. and monitored basis as the fluid is injected into the underground reservoir. Other methods of preparing the chosen treatment fluid will be well known to those skilled in the art.

The concentrations of ester and the material present in the treatment fluid will depend on the required amounts of acid production and breaker.

This will depend on the specific formulation of the treatment fluid but will typically be of the order of 10 to 200 grams per liter of ester and 0.2 to 10 grams per liter of other components, although higher or lower concentrations may be appropriate in some situations. The concentration of any enzyme breaker will be selected such that the polymer/gel will be degraded within the desired period of time. Typical enzyme concentrations will be 0.05% to 5% v/v of commercial liquid enzyme preparations or about 0.005 to 0.5% v/v of dried enzyme preparation. Preferably liquid preparations of enzymes will be used for ease of handling.

More than one ester may be incorporated into the formulation depending on the nature of the formation damage and the type of treatment. Similarly more than one type of polymer breaker may be incorporated into the formulation. Where an enzyme preparation is included in the formulation to produce a peracid in the presence of an ester and hydrogen peroxide, more than one enzyme preparation may be incorporated. A single solution or dispersion containing all of the components is preferably used.

In some embodiments of the present invention, it may be desirable to incorporate more than one type of polymer breaker, for example an oxidant might be used in combination with an enzyme breaker in the case where two polysaccharides are present but only one is amenable to attack by an enzyme.

Oxidants and enzymes may if desired also be used in the form of delayed release preparations, such as will be well known by those skilled in the art.

The treatment fluid comprising, in water, the ester, polymer breaker and, if desired, enzyme capable of hydrolyzing the ester, is conveniently introduced into the underground formation via injection or production wells. If being introduced into a newly drilled well, particularly if being used to remove damage caused during drilling, such as filter cakes, the fluid may conveniently be introduced through the drill string using the mud pumps. The low corrosivity of the fluid will permit introduction into wells or the drill string without the need to add corrosion inhibitors. The fluid will normally be introduced at below fracture pressure but may if desired be injected at above fracture pressure.

The treatment fluid may contain further chemical additives such as are commonly used in the oil industry, such as surfactants, foaming and chelating agents if their inclusion is deemed to be beneficial and if they are compatible with the other components of the treatment fluid.

For near wellbore treatments, the volume of treatment fluid introduced into the reservoir will typically be at least equal to the wellbore volume plus an allowance for some leak off into the formation. A fluid volume of between 120% and 200% of the wellbore volume will normally be used although if a high rate of fluid loss is expected a volume up to 300% or higher of the well bore volume may be selected. For treatments where the target is damage deeper into the formation such as in natural or induced fractures or fracture networks a volume will be selected appropriate to the requirements of the treatment.

In one embodiment of the present invention, a volume of the treatment fluid, containing both ester and polymer breaker, which is sufficient to allow the fluid to penetrate one to several meters into a carbonate formation around a wellbore or behind a fracture face may be used. This can result in an increase in the matrix permeability of a carbonate formation to a depth of one to several meters in addition to and at the same time as removing damage from the near wellbore region or the fracture faces. In such cases a negative skin can result further increasing the productivity of the well beyond that which can be achieved with even complete near wellbore damage removal. The volume of fluid needed for such treatments will depend on the porosity of the formation, desired depth of penetration and dimensions of the wellbore, fracture or fracture network. Such an approach may also be effective for treating carbonate scaled sandstone reservoirs which also suffer from near wellbore damage, again using a single stage treatment.

The well will normally be shut in after introduction of the treatment fluid for a period, typically between 2 hours and a week, preferably 6–48 hours, to allow production of acid and breaking of the polymer. The well is then put on or returned to production, or in the case of injection wells, put on injection.

The present invention has the following particular advantages over the prior art:

The method provides a simple, effective and convenient way to treat damage caused by combinations of both acid soluble material and polymers using a single fluid. In particular the method provides a single stage treatment capable of completely removing filter cake damage caused by those drilling fluids containing carbonate as a fluid loss material and polymers. Previous treatment methods have been designed to treat only the acid soluble material or only the polymer component of such damage.

The method also allows the successful incorporation of oxidant or enzyme polymer breakers into a treatment fluid able to deliver a high concentration of acid. Because the acid is present in a non-acidic precursor form, the breakers are not inactivated, as many would be by contact with conventional acids, and the activity of certain breakers is subsequently enhanced by the onset of moderate acidic conditions. This takes place after placement of the fluid, ensuring that both the acid and the breaker are delivered where they are needed.

As well as near wellbore or fracture face damage removal the treatment fluid can also be used to achieve deep matrix stimulation during the same treatment. Because the fluid is essentially non-reactive when placed, excellent zonal coverage can be achieved.

Also the method is generally a very low hazard method compared to previous methods involving a substantive degree of acidising. The method uses high flash point esters and liquid preparations of enzymes. There is generally no need for high pressure, high rate injection.

The components of the system are generally environmentally acceptable. The esters and enzymes and certain oxidant components such as the percarbonates are of low environmental impact. Also, the fluids are not highly corrosive, meaning that the use of corrosion inhibitors is generally not required which gives additional environmental benefits.

The following example illustrates the invention.

EXAMPLE 1

The effectiveness of a range of treatment fluids containing ester, polymer breaker and where desirable an esterase (to increase the rate of ester hydrolysis or to produce a peracid in the presence of hydrogen peroxide) was assessed. The fluids were applied to filter cakes and the flow rate of water through the filter cake was measured.

The rate at which water could pass through a Whatman no. 1 filter paper disc under a negative pressure of 30 p.s.i. was measured. The discs were damaged by passing a water based drilling mud comprising calcium carbonate, starch and xanthan through the disc until a filter cake had formed. The rate at which water could pass through under a negative pressure of 30 p.s.i. was again measured. The filter cakes were then exposed to the treatment indicated for a 24 hour period at the temperature indicated and the rate at which water could pass through the disc measured again. The results obtained are shown in Table 1.

TABLE 1

Examples of results obtained with selected formulations

| | | Formulation: | | | | | | Regained |
|---|---|---|---|---|---|---|---|---|
| Type of damage | Temperature ° C. | 5% w/v Triacetin | 2% w/v sodium percarbonate | Starch breaking enzyme | Xanthan breaking enzyme | Esterase | Damaged flow rate | flow as percentage of initial rate |
| 1 | 60 | + | + | | | + | 0 | >95 |
| 1 | 80 | + | + | | | + | 0 | >95 |
| 1 | 110 | + | + | | | | 0 | 100 |
| 1 | 130 | + | + | | | | 0 | 100 |
| 1 | 50 | + | | | + | + | 0 | >95 |
| 1 | 60 | + | | + | + | + | 0 | 100 |
| 1 | 60 | + | | + | | + | 0 | 100 |
| 1 | 60 | + | + | + | + | + | 0 | >95 |
| 1 | 80 | + | + | + | + | + | 0 | 100 |
| 1 | 110 | + | | + | | | 0 | 100 |
| 1 | 120 | + | | + | | | 0 | 100 |

Key:
1 Filter cake formed from carbonate/starch/xanthan drilling mud

What is claimed is:

1. A method for treating an underground reservoir, which method comprises introducing into the reservoir a treatment fluid comprising, dissolved or dispersed in water, an ester and a polymer breaker selected from the group consisting of oxidants and enzyme breakers, such that the ester hydrolyses to produce an organic acid to dissolve acid soluble material present in or adjacent to filter cake or other damage in the reservoir and the polymer breaker degrades polymeric material present in filter cake or biofilm within the reservoir.

2. A method according to claim 1 wherein the underground reservoir is a hydrocarbon reservoir.

3. A method according to claim 2 which further comprises recovering a hydrocarbon from the treated reservoir.

4. A method according to claim 2 wherein the hydrocarbon is oil.

5. A method according to claim 2 wherein the hydrocarbon is a gas.

6. A method according to claim 1 wherein the underground reservoir is a water reservoir.

7. A method according to claim 6 which further comprises recovering water from the treated reservoir.

8. A method according to claim 1 wherein the ester is a carboxylic acid ester.

9. A method according to claim 1 wherein the ester is an ester of an aliphatic carboxylic acid of formula $RCO_2H$ wherein R is selected from the group consisting of hydrogen, an alkyl group having from 1 to 6 carbon atoms and —R=—$CO_2H$ where R= is a bond or an alkylene group having from 1 to 6 carbon atoms, the alkyl or alkylene group being unsubstituted or substituted by halogen or hydroxy.

10. A method according to claim 1 wherein the ester is 1,2,3-propanetriol triacetate, 1,2,3-propanetriol diacetate, ethylene glycol diacetate, diethylene glycol diacetate or triethylene glycol diacetate.

11. A method according to claim 1 wherein the ester concentration is at least about 5% w/v in the treatment fluid.

12. A method according to claim 1 wherein the polymer breaker is a hydrolase enzyme.

13. A method according to claim 12 wherein the enzyme is a lipase, esterase or protease enzyme.

14. A method according to claim 12 wherein the or each enzyme is in the form of a delayed release preparation.

15. A method according to claim 1 wherein the polymer breaker is a polysaccharide hydrolysing enzyme.

16. A method according to claim 1 wherein the polymer breaker is an enzyme which can hydrolyse starch, xanthan, cellulose, guar, scleroglucan or succinoglycan or a derivative of any one of these polymers.

17. A method according to claim 1 wherein the polymer breaker is an oxidant selected from the group consisting of persulphate, hypochlorite, peroxide, perborate, percarbonate, perphosphate, persilicate and a metal cation or hydrogen peroxide adduct.

18. A method according to claim 1 wherein the polymer breaker is an oxidant in the form of a delayed release preparation.

19. A method according to claim 1 wherein the treatment fluid further comprises an enzyme which can hydrolyse the ester.

20. A method according to claim 1 wherein the treatment fluid further comprises a peroxide.

21. A method according to claim 20 wherein the peroxide is a perborate or percarbonate.

22. A method according to claim 1 wherein the temperature of the formation bearing the acid soluble material and polymeric material is at least 40° C. or higher.

23. A method according to claim 1 wherein the treatment fluid is left in the reservoir for at least 1 hour.

24. A method according to claim 1 wherein the treatment fluid is introduced into the reservoir via a wellbore which extends to the reservoir.

25. A method according to claim 24 wherein the wellbore is vertical, deviated, inclined or horizontal.

26. A method according to claim 1 wherein the treatment fluid is introduced into the reservoir via the drillstring.

27. A method according to claim 1 wherein the treatment fluid is introduced into the reservoir via coiled tubing.

28. A method according to claim 1 wherein the treatment fluid is introduced into the reservoir via bullheading.

29. A method according to claim 1 wherein the treatment fluid is injected at a rate below the reservoir fracture pressure.

30. A method according to claim 1 wherein the treatment fluid is injected at a rate above the reservoir fracture pressure.

31. A method according to claim 1 wherein the reservoir is or includes a carbonate rock structure.

32. A method according to claim 1 wherein the object of the treatment is the removal of a filter cake.

33. A method according to claim 1 wherein the object of the treatment is the removal of a biofilm.

* * * * *